UNITED STATES PATENT OFFICE 2,069,570

COMPOSITION OF MATTER FOR THE SOFTENING OF TEXTILES

Otto Albrecht, Basel, Switzerland, assignor to the firm Society of Chemical Industry in Basle, Basel, Switzerland No Drawing. Application July 5, 1935, Serial No. 30,017. In Switzerland July 9, 1934

20 Claims. (Cl. 252—1)

This invention relates to a process of softening textiles, paper, leather and the like substances by treating them with a mixture containing on the one hand a substance adapted to prevent the separation of lime soaps in hard water and on the other hand a product of the general formula

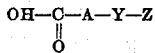

or a salt of such product, in which formula A represents an alkyl-, cycloalkyl- or aryl-radical, Y a

group, which may be connected with the alkyl-cycloalkyl- or aryl-radical A by means of the carbon atom or the oxygen atom and Z an aliphatic radical containing at least 8 carbon atoms and, if desired, substituents. As compared with the products of the aforesaid general formula the mixtures of this invention have the advantage that they prevent disturbing precipitation in hard water.

As substances which prevent the separation of lime soaps in hard water there come into consideration, for example, highly sulfonated oils, esters formed from aromatic sulfo-dicarboxylic acids and alcohols of high molecular weight, sulfonic acids of benzimidazoles which may be alkylated, arylated or aralkylated and have attached to the γ-carbon atom a side chain of at least 8 carbon atoms, acid sulfuric acid esters of alcohols of high molecular weight, such as lauryl-, myristyl-, cetyl-, stearine- or olein-alcohol-sulfuric acid ester or esters and amides from fatty acids of high molecular weight on the one hand and hydroxy- or amino-alkyl-sulfonic acids on the other hand, such as oleic acid-isethionic acid-ester, oleyl-taurine and like compounds.

As highly sulfonated oils there may be used, for example, products which are obtainable by sulfonating castor oil in presence of sulfophthalic acid-anhydride. There also come into consideration other highly sulfonated oils which are obtainable, for example, from castor oil or other esters of ricinoleic acid with aid of chlorosulfonic acid in presence of a solvent. Furthermore, condensation products of the kind produced by the Twitchell reaction made, for instance, from mixtures of oleic acid with benzene, phenol or naphthol may be used with advantage. As esters formed from aromatic sulfodicarboxylic acids and alcohols of high molecular weight there may be used those which are produced by esterifying aromatic sulfo-dicarboxylic acids, such as sulfophthalic acid, sulfoterephthalic acid, sulfochlorophthalic acid, sulfonaphthalic acid, the esterifying agent being a higher alcohol, such as lauryl-, tetradecyl-, hexadecyl-, octodecyl-, olein-alcohol, stearylene-glycol, hexadecyl-mono-glycol ether, stearic acid-monoglyceride or mixtures of these. Suitable benzimidazoles of sulfonic acids are, for example, the sulfonation products from γ-undecyl-, pentadecyl-, heptadecyl-, heptadecenyl-benzimidazole or the sulfonation product of γ-heptadecyl-N-benzyl benzimidazole. The substances which prevent the separation of lime soaps in hard water may be represented by the general formula

in which R stands for an aliphatic chain of at least 8 carbon atoms, X stands for

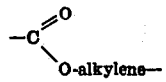

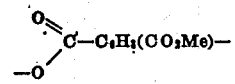

or

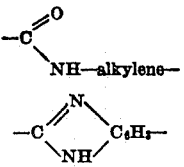

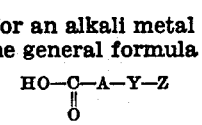

and Me stands for an alkali metal or ammonium.

Products of the general formula $$HO-\underset{\underset{O}{\|}}{C}-A-Y-Z$$

are, for example, the ester acids or salts of aliphatic, cycloaliphatic or aromatic dicarboxylic acids, such as adipic acid, succinic acid, ethylene-α, β-dicarboxylic acids, phthalic acid, isophthalic acid, terephthalic acid, substituted phthalic acid, such as chlorophthalic acids, hexahydrobenzene-dicarboxylic acids, such as hexahydrophthalic acids, such acids being esterified by means of an aliphatic alcohol having at least 8 carbon atoms, and, if desired, containing substituents. Such alcohols or substituted alcohols are, for example, those corresponding with fatty acids of high molecular weight, such as octyl-, decyl-, lauryl-, myristyl-, cetyl- or octadecyl-alcohol, or mixtures of these, such as are, for example, obtainable by the reduction of fatty acids of high molecular weight, which are saturated or unsaturated or contain hydroxy-groups, or esters of such fatty acids, for example coconut oil, castor oil or the like. Also unsaturated alcohols of high molecular weight, such as olein-alcohol or the alcohols from spermaceti oil may be used; as also the alkylene-glycols obtainable by the hydratation of unsaturated alcohols; also the products obtainable by addition of halogen to unsaturated alcohols and such alcohols as are obtainable by scission of waxes, for instance of beeswax, or by oxidation of paraffin hydrocarbons. Secondary alcohols may be made by reduction of aliphatic ketones, such as palmitone, stearone, pentadecyl-methylketone. The hydroxyl groups may be primary, secondary or tertiary. The carbon chain of the alcohol of high molecular weight may be interrupted by a divalent atom, such as oxygen or sulfur. Such oxy-derivatives are, for example, polyglycols, polyglycerines, diethyleneglycol-mono-butylether, of high molecular weight; also substituted alphatic alcohols of high molecular weight, for instance castor oil, or other esters of hydroxy-fatty acids, such as hydroxystearic acid-ethylester.

Products of the general formula

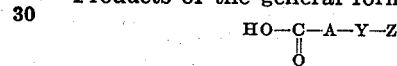

in which Y is bound by means of the oxygen atom to the radical A, are esters from aliphatic, cycloaliphatic or aromatic hydroxycarboxylic acids, such as glycolic acid, lactic acid, hexahydro-oxybenzoic acids, for example hexahydrosalicylic acid, hydroxybenzoic acids, hydroxynaphthoic acids, for instance from salicylic acid on the one hand and aliphatic, saturated or unsaturated carboxylic acids, having at least 8 carbon atoms which may also contain hydroxyl-groups or halogen atoms, on the other hand. Examples of these esters are lauryl-, palmityl-, stearyl-, olein-glycolic acid, laurylhexahydrosalicylic acid, palmitylsalicylic acid.

The constituents of the mixtures which are to be used in accordance with this invention may be mixed, for example, in the form of dry alkali salts or ammonium salts. It is also possible to mix together aqueous solutions or concentrated pastes of the soluble salts of the several constituents. In both cases compositions of matter are obtained which are characterized by a content of a product of the general formula

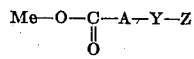

in which Me stands for an alkali metal or ammonium, A for an alkyl-, cycloalkyl- or aryl-radical, Y for a

group which is attached to the alkyl, cycloalkyl- or aryl-radical A by means of the carbon atom or the oxygen atom, and Z for an aliphatic radical having at least 8 carbon atoms, and a sulfonation product of an organic compound which contains an aliphatic chain of at least 8 carbon atoms, and which prevents the separation of lime soaps in hard water, which compositions of matter form also the subject-matter of the present invention. Finally the several constituents of the mixture to be used may be added to the treatment liquor, in which case it is advantageous to add first the substance which prevents the separation of lime soaps and then the product of the general formula

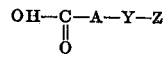

Thus baths are obtained in these cases for the softening of textiles, consisting of an aqueous liquor characterized by a content of a product of the general formula

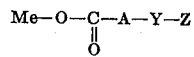

in which Me stands for an alkali metal or ammonium, A for an alkyl-, cycloalkyl- or aryl-radical, Y for a

group which is attached to the alkyl-, cycloalkyl- or aryl-radical A by means of the carbon atom or the oxygen atom, and Z for an aliphatic radical having at least 8 carbon atoms, and a sulfonation product of an organic compound which contains an aliphatic chain of at least 8 carbon atoms, and which prevents the separation of lime soaps in hard water, which baths form also the subject-matter of the present invention.

The products which are to be used in this invention impart to the fibres treated with them, particularly artificial silk from regenerated cellulose or organic derivatives of cellulose, such as viscose, cellulose acetate or copper cellulose, a full and soft feel. The products can easily be obtained practically colorless and are thus suitable also for undyed textiles or textiles dyed light tints. Since the products described yield no precipitate with acid or neutral dyeing dyestuffs they may be added directly to the dye-bath which may be made with soft or hard water. In many cases a softer feel will be imparted in hard water than in soft water. With the same result there may be added to the bath made with soft water soluble salts, in particular those of polyvalent metals, such as calcium chloride, magnesium sulfate or barium sulfate. The textiles may be further treated with dilute solutions. The products have the additional advantage that they behave simultaneously as wetting agents and washing agents. They may be used alone or together with other suitable materials, such as washing agents or finishing agents.

The following examples illustrate the invention:—

*Example 1*

Viscose artificial silk is dyed in a liquor ratio of 1:30 in hard water containing per litre 0.66 gram of Direct Sky Blue, green shade (Colour Index No. 518), 10 grams of crystallized Glauber's salt and 0.5 gram of an aqueous paste containing 5.7 per cent. of the disodium salt of the monoester from sulfophthalic acid and the commercial mixture of hexadecyl- and octadecyl-alcohols, as well as 17 per cent. of the semi-ester from phthalic-acid-anhydride and the said mixture of higher alcohols, converted into its ammonium salt. After handling for an hour at a temperature close to the boiling point the material is rinsed in ordinary water, centrifuged and dried. The goods thus treated have a soft, flowing feel.

Example 2

White viscose artificial silk fabric is treated for 20 minutes in a lukewarm bath to which has been added, per litre of hard water, 0.5 gram of an aqueous paste containing 2.8 per cent. of the sodium salt of the sulfonation product of γ-heptadecyl-N-benzimidazole and 17.3 per cent. of the semi-ester from phthalic-acid-anhydride and the commercial mixture of hexadecyl- and octadecyl-alcohols converted into its ammonium salt. The artificial silk acquires a soft, sliding feel.

Instead of the described phthalic ester-acid there may be used the ester-acid obtainable from 1 mol. hexahydro-phthalic acid-anhydride and 1 mol. of olein alcohol. With like result the ammonium salt of the stearyl-salicylic acid, obtained from salicylic acid and stearic acid chloride in pyridine solution, may be used in conjunction with one of the aforesaid sulfonation products to produce softening effect.

Example 3

For dyeing cuprammonium artificial silk a liquor ratio of 1:30 is used in a dye-bath made with hard water, to which there has been added per litre 0.7 gram of an aqueous paste containing 2.5 per cent. of the sodium salt of the γ-heptadecyl-benzimidazole-sulfonic acid and 15 per cent. of the semi-ester from phthalic acid-anhydride and olein alcohol, converted into its ammonium salt. The dyed artificial silk has a soft feel.

Example 4

For dyeing artificial silk stockings with direct dyestuffs there may be used a liquor ratio of 1:30 in a hard water bath to which has been added, per litre, 0.5 gram of an aqueous paste containing 9.1 per cent. of an oil made by sulfonating castor oil in presence of sulfophthalic acid-anhydride and also 18.2 per cent. of the semi-ester from phthalic acid anhydride and the commercial mixture of hexadecyl- and octadecyl-alcohols, converted into its ammonium salt. The dyed stockings are very soft and supple.

Example 5

For softening dyed and rinsed cotton fabrics they may be treated at room temperature with a liquor to which has been added, per litre, 10 grams of an aqueous paste containing 6.25 per cent. of the disodium salt of the mono-ester from sulfophthalic acid and a mixture of octadecyl- and hexadecyl-alcohols, as well as 18.75 per cent. of the semi-ester from phthalic acid anhydride and a mixture of olein- and cetyl-alcohols, converted into its sodium salt. The goods are then dried. The fabrics thus obtained have a soft feel.

In like manner wool and semi-wool fabrics may be softened.

Example 6

For dyeing viscose artificial silk stockings with direct dyestuffs in a dyeing apparatus there is used for 40 kilos of goods, 0.4 kilo of the aqueous paste specified in Example 5. After the dyeing operation the batch of goods in the apparatus is finally rinsed, centrifuged and pressed. The stockings thus treated have a soft feel.

Example 7

20 parts by weight of knitted goods made from viscose artificial silk are dyed in the usual manner in a liquor consisting of 800 parts of water, containing 0.1 part of the aqueous paste described in Example 5, 1.6 parts of crystallized magnesium sulfate, 0.2 part of Direct Sky Blue, green shade, (Colour Index, No. 518) and 2 parts of crystallized Glauber's salt. The rinsed and dried goods have a soft feel.

Example 8

Silk stockings are dyed in a dye-bath containing 2 per cent. of Orange II (Colour Index, No. 151), 1 per cent. of Roccelin (Colour Index, No. 176), 0.5 per cent. of Kiton Pure Blue V (Colour Index, No. 672), 10 per cent. of crystallized Glauber's salt, 4 per cent. of acetic acid of 40 per cent. strength and 1 per cent. of the paste described in Example 5. The goods are entered at 40° and the bath is gradually raised to the boil. The stockings thus treated have, after being rinsed and dried, a soft feel. In like manner chromiferous ortho-hydroxyazo-dyestuffs may be used for the dyeing.

Example 9

Viscose artificial silk is dyed as directed in Example 1 but instead of the paste therein specified there is used one which contains 6.25 per cent. of the disodium salt of the mono-ester from sulfophthalic acid and a mixture of octadecyl- and hexadecyl-alcohols, 18.75 per cent. of the semi-ester from adipic acid and a mixture of higher aliphatic alcohols, containing chiefly olein-alcohol, converted into its sodium salt, and 75 per cent. of water. The rinsed and dried goods have a soft feel.

What I claim is:—

1. A composition of matter, characterized by a content of a product of the general formula

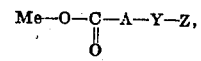

in which Me stands for a member of the group consisting of an alkali metal and ammonium, A for a member of the group of radicals consisting of alkyl, cycloalkyl and aryl radicals, Y for a

-group wherein one valency is attached to a member A of the group of radicals consisting of alkyl, cycloalky and aryl radicals and the other valency is bound to the radical Z and in which Z stands for an aliphatic radical having at least 8 carbon atoms, and a salt of an organic sulfonic acid of the general formula $$R—X—SO_3Me$$

in which R stands for an aliphatic chain having at least 8 carbon atoms, X stands for a member selected from the group consisting of

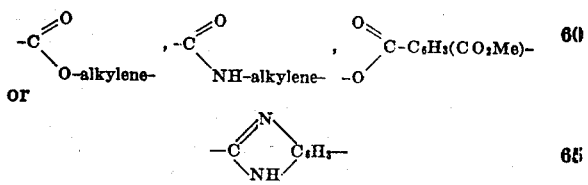

and Me has the aforesaid signification.

2. A composition of matter, characterized by a content of a product of the general formula

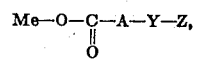

in which Me stands for a member of the group consisting of an alkali metal and ammonium, A for a member of the group of radicals consisting of alkyl, cycloalkyl and aryl radicals, Y for a

-group wherein one valency is attached to a member A of the group of radicals consisting of alkyl, cycloalkyl and aryl radicals and the other valency is bound to the radical Z and in which Z stands for an aliphatic radical having at least 8 carbon atoms, and a monocarboxylic acid ester from sulfophthalic acid and an aliphatic alcohol containing at least 8 carbon atoms.

3. A composition of matter, characterized by a content of a product of the general formula $$Me-O-\underset{\underset{O}{\|}}{C}-A-Y-Z$$

in which Me stands for a member of the group consisting of an alkali metal and ammonium, A for a member of the group of radicals consisting of alkyl, cycloalkyl and aryl radicals, Y for a

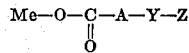

-group wherein one valency is attached to a member A of the group of radicals consisting of alkyl, cycloalky and aryl radicals and the other valency is bound to the radical Z and in which Z stands for an aliphatic radical having at least 8 carbon atoms, and a monocarboxylic acid ester from sulfophthalic acid and an aliphatic alcohol containing at least 16 and not more than 18 carbon atoms.

4. A composition of matter, characterized by a content of a product of the general formula $$Me-O-\underset{\underset{O}{\|}}{C}-A-Y-Z$$

in which Me stands for a member of the group consisting of an alkali metal and ammonium, A for a member of the group of radicals consisting of alkyl, cycloalkyl and aryl radicals, Y for a

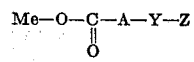

-group wherein one valency is attached to a member A of the group of radicals consisting of alkyl, cycloalkyl and aryl radicals and the other valency is bound to the radical Z and in which Z stands for an aliphatic radical having at least 8 carbon atoms, and a monocarboxylic acid ester from sulfophthalic acid and octadecyl alcohol.

5. A composition of matter, characterized by a content of a product of the general formula.

$$Me-O-\underset{\underset{O}{\|}}{C}-A-Y-Z$$

in which Me stands for a member of the group consisting of an alkali metal and ammonium, A for a member of the group of radicals consisting of alkyl, cycloalkyl and aryl radicals, Y for a

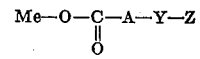

-group which is attached to a member A of the group of radicals consisting of alkyl, cycloalkyl and aryl radicals by means of the carbon atom, and Z for an aliphatic radical having at least 8 carbon atoms in a straight chain, and a salt of an organic sulfonic acid of the general formula R—X—SO₃Me in which R stands for an aliphatic chain having at least 8 carbon atoms, X stands for a member selected from the group consisting of

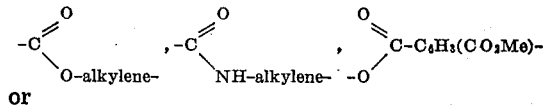

or

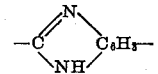

and Me has the aforesaid signification.

6. A composition of matter, characterized by a content of a product of the general formula $$Me-O-\underset{\underset{O}{\|}}{C}-A-Y-Z$$

in which Me stands for a member of the group consisting of an alkali metal and ammonium, A for an aryl-radical of the benzene series, Y for a

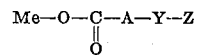

-group which is attached to the aryl-radical A by means of the carbon atom, and Z for an aliphatic radical having at least 8 carbon atoms in a straight chain, and a salt of an organic sulfonic acid of the general formula R—X—SO₃Me in which R stands for an aliphatic chain having at least 8 carbon atoms, X stands for a member selected from the group consisting of

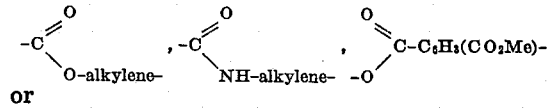

or

and Me has the aforesaid signification.

7. A composition of matter, characterized by a content of a product of the general formula $$Me-O-\underset{\underset{O}{\|}}{C}-A-Y-Z$$

in which Me stands for a member of the group consisting of an alkli metal and ammonium, A for an aryl-radical of the benzene series, Y for a

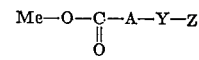

-group which is attached to the aryl-radical A by means of the carbon atom, and Z for an aliphatic radical having at least 16 carbon atoms in a straight chain, and a salt of an organic sulfonic acid of the general formula R—X—SO₃Me in which R stands for an aliphatic chain having at least 8 carbon atoms, X stands for a member selected from the group consisting of

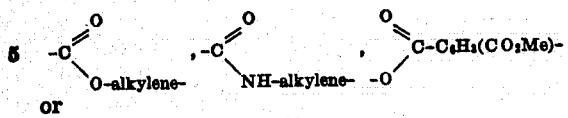
or

and Me has the aforesaid signification.

8. A composition of matter, characterized by a content of a product of the general formula Me—O—C—A—Y—Z
$\quad\quad\;\;\|$
$\quad\quad\;\;$O in which Me stands for a member of the group consisting of an alkali metal and ammonium, A for an aryl-radical of the benzene series, Y for a

-group which is attached to the aryl-radical A by means of the carbon atom, and Z for an aliphatic radical having 18 carbon atoms in a straight chain, and a salt of an organic sulfonic acid of the general formula R—X—SO₃Me in which R stands for an aliphatic chain having at least 8 carbon atoms, X stands for a mem- selected from the group consisting of

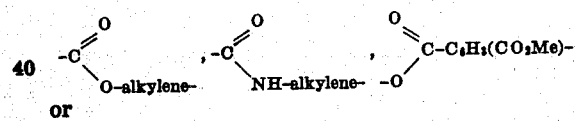
or

and Me has the aforesaid signification.

9. A composition of matter, characterized by a content of the product of the general formula

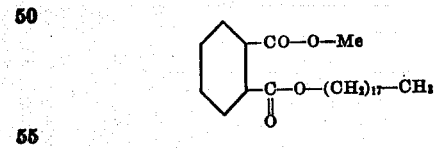

in which Me stands for a member of the group consisting of an alkali metal and ammonium, and a salt of an organic sulfonic acid of the general formula R—X—SO₃Me in which R stands for an aliphatic chain having at least 8 carbon atoms, X stands for a member selected from the group consisting of

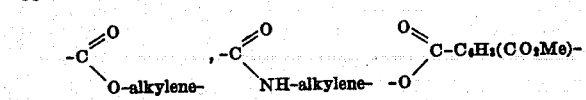
or

and Me has the aforesaid signification.

10. A composition of matter, characterized by a content of the product of the general formula

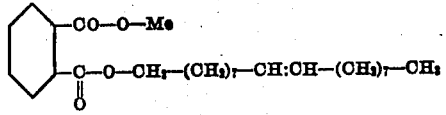

in which Me stands for a member of the group consisting of an alkali metal and ammonium, and a salt of an organic sulfonic acid of the general formula R—X—SO₃Me in which R stands for an aliphatic chain having at least 8 carbon atoms, X stands for a member selected from the group consisting of

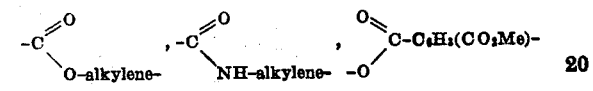
or
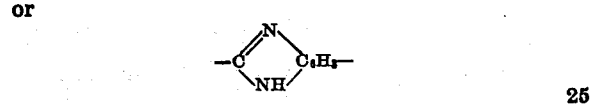

and Me has the aforesaid signification.

11. A composition of matter, characterized by a content of the product of the general formula

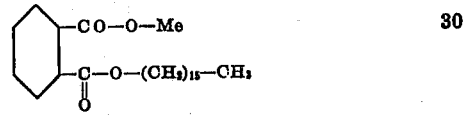

in which Me stands for a member of the group consisting of an alkali metal and ammonium, and a salt of an organic sulfonic acid of the general formula R—X—SO₃Me in which R stands for an aliphatic chain having at least 8 carbon atoms, X stands for a member selected from the group consisting of

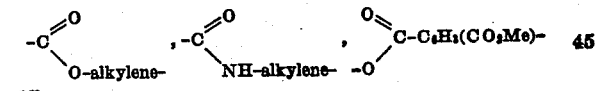
or
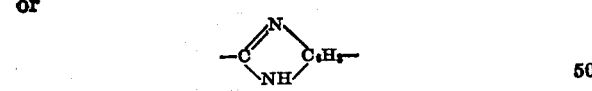

and Me has the aforesaid signification.

12. A composition of matter, characterized by a content of the product of the general formula

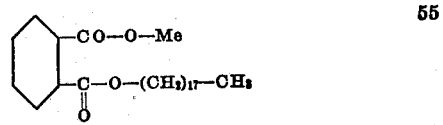

in which Me stands for a member of the group consisting of an alkali metal and ammonium and a monocarboxylic acid ester from sulfo- phthalic acid and an aliphatic alcohol containing at least 8 carbon atoms.

13. A composition of matter, characterized by a content of the product of the general formula

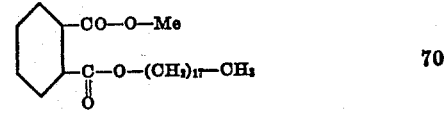

in which Me stands for a member of the group consisting of an alkali metal and ammonium and a monocarboxylic acid ester from sulfophthalic acid and an aliphatic alcohol containing at least 16 and not more than 18 carbon atoms.

14. A composition of matter, characterized by a content of the product of the general formula

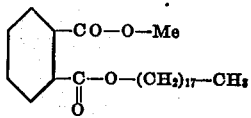

in which Me stands for a member of the group consisting of an alkali metal and ammonium and a monocarboxylic acid ester from sulfophthalic acid and octadecyl alcohol.

15. A composition of matter, characterized by a content of the product of the general formula

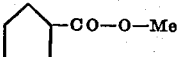

in which Me stands for a member of the group consisting of an alkali metal and ammonium and a monocarboxylic acid ester from sulfophthalic acid and an aliphatic alcohol containing at least 8 carbon atoms.

16. A composition of matter, characterized by a content of the product of the general formula

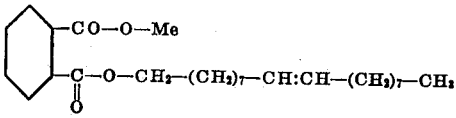

in which Me stands for a member of the group consisting of an alkali metal and ammonium and a monocarboxylic acid ester from sulfophthalic acid and an aliphatic alcohol containing at least 16 and not more than 18 carbon atoms.

17. A composition of matter, characterized by a content of the product of the general formula

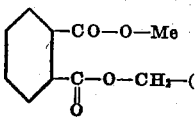

in which Me stands for a member of the group consisting of an alkali metal and ammonium and a monocarboxylic acid ester from sulfophthalic acid and octadecyl alcohol.

18. A composition of matter, characterized by a content of the product of the general formula

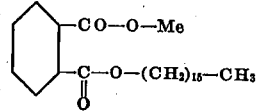

in which Me stands for a member of the group consisting of an alkali metal and ammonium and a monocarboxylic acid ester from sulfophthalic acid and an aliphatic alcohol containing at least 8 carbon atoms.

19. A composition of matter, characterized by a content of the product of the general formula

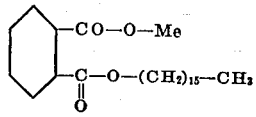

in which Me stands for a member of the group consisting of an alkali metal and ammonium and a monocarboxylic acid ester from sulfophthalic acid and an aliphatic alcohol containing at least 16 and not more than 18 carbon atoms.

20. A composition of matter, characterized by a content of the product of the general formula

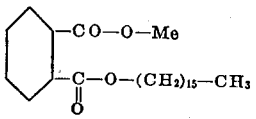

in which Me stands for a member of the group consisting of an alkali metal and ammonium and a monocarboxylic acid ester from sulfophthalic acid and octadecyl alcohol.

OTTO ALBRECHT.